UNITED STATES PATENT OFFICE.

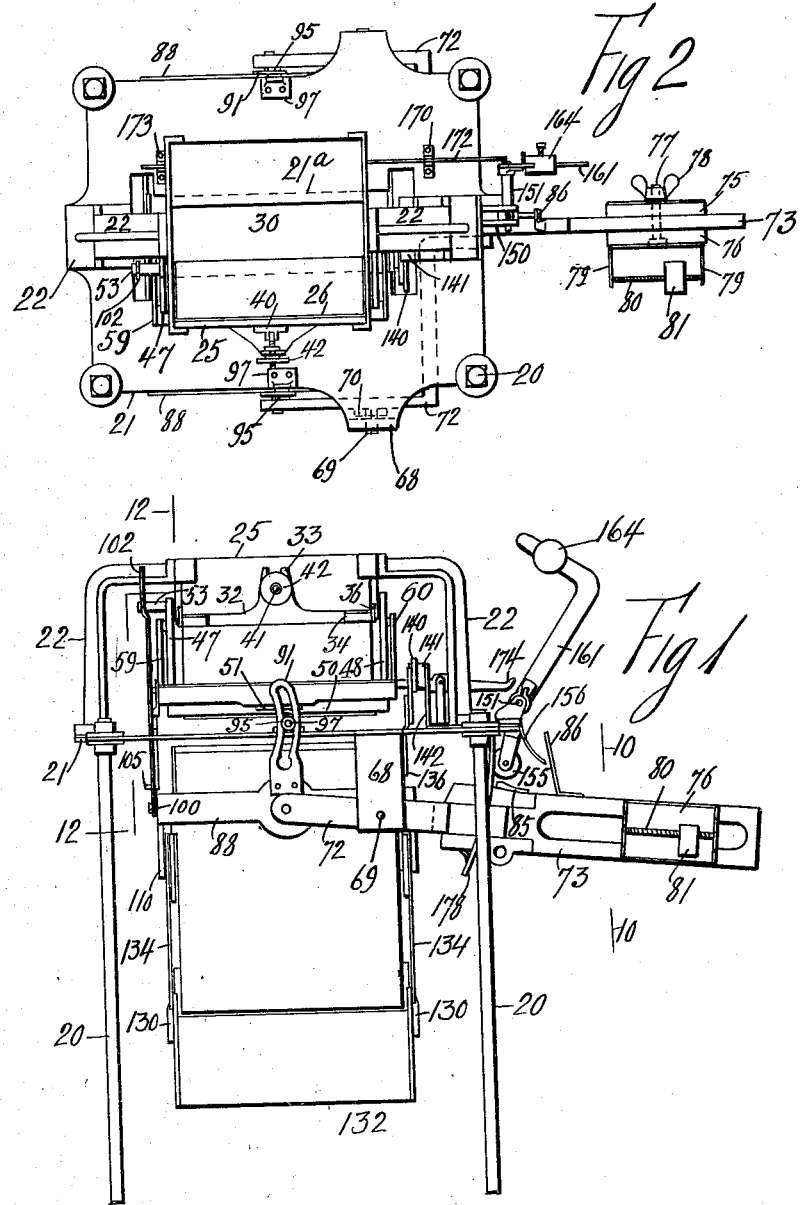

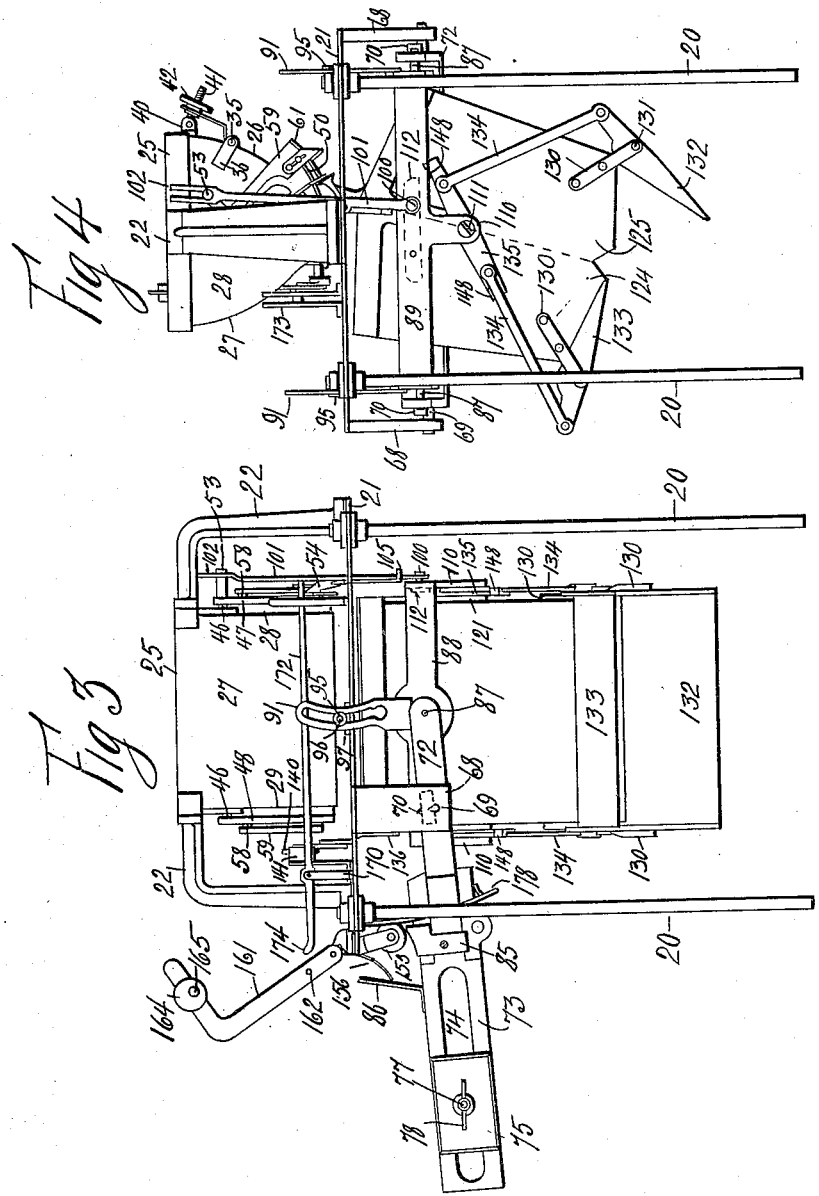

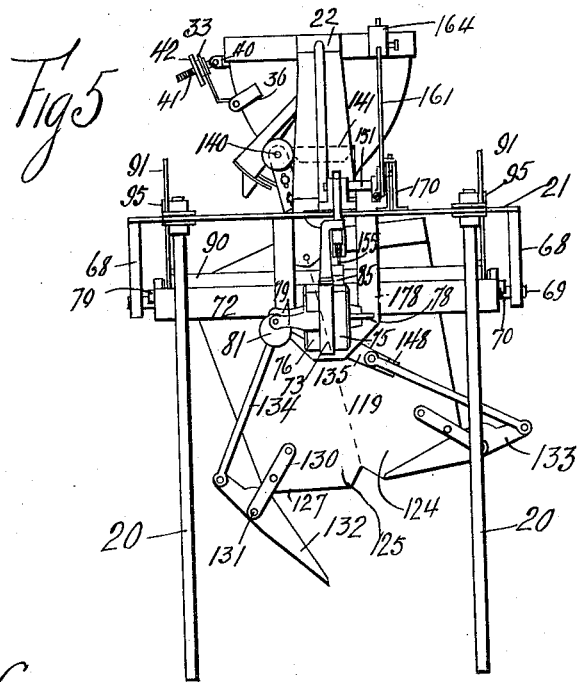

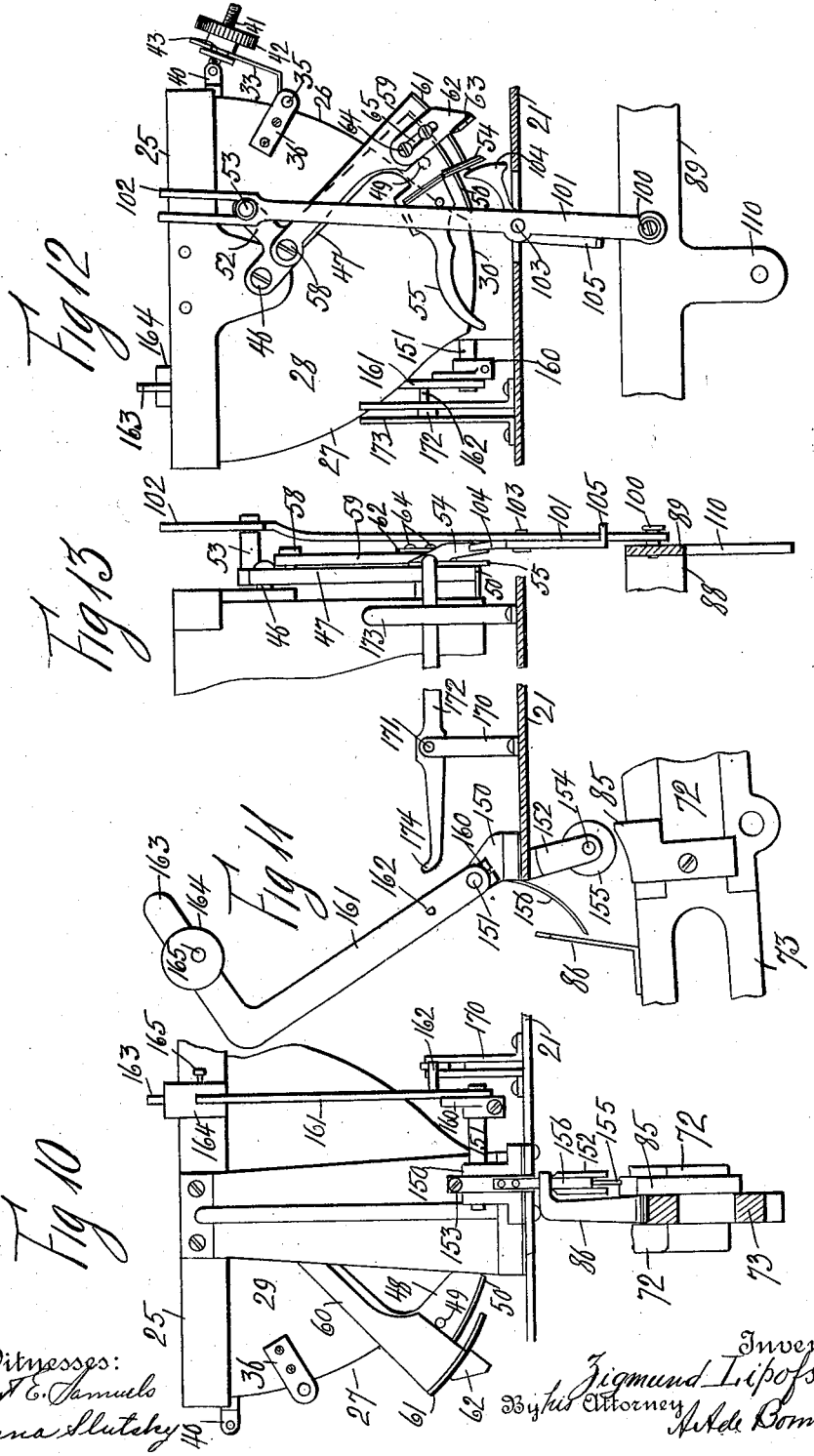

ZIGMUND LIPOFSKY, OF HOBOKEN, NEW JERSEY.

WEIGHING APPARATUS.

1,143,638.  Specification of Letters Patent. Patented June 22, 1915.

Application filed May 7, 1912. Serial No. 695,592.

*To all whom it may concern:*

Be it known that I, ZIGMUND LIPOFSKY, a citizen of the Empire of Russia, and resident of Hoboken, in the county of Hudson and State of New Jersey, have invented certain new and useful Improvements in Weighing Apparatus, of which the following is a specification.

The invention relates to a weighing apparatus, and is characterized by means to deliver consecutively charges equal in weight. It is shown to comprise a charging hopper supported on a table with a weighing hopper suspended below the same. The material to be weighed first enters the charging hopper and from there enters the discharging hopper. The material in the latter automatically with the means described, actuates a pair of doors for an opening in the said charging hopper.

Figure 1 represents a front view of the weighing apparatus, Fig. 2 shows a top view of Fig. 1, Fig. 3 is a rear view of Fig. 1, Fig. 4 represents a left hand view of Fig. 1, Fig. 5 shows a right hand view of Fig. 1, Fig. 6 is a partial top view of Fig. 5, Fig. 7 is a front elevation and partial section of Fig. 6 on the line 7, 7, Fig. 8 shows a side elevation of the weighing hopper, Fig. 9 is a side view of Fig. 8, Fig. 10 represents an enlarged right hand view and section of Fig. 1 on the line 10, 10, Fig. 11 shows a right hand side view with a partial section of Fig. 10, Fig. 12 represents a left hand view and section of Fig. 1 on the line 12, 12 and Fig. 13 is a left hand view of Fig. 12 partly in section.

The apparatus is shown to comprise the legs 20 which support the table 21 having the opening 21ª. Supporting brackets 22 are carried on said table, which in turn support the charging hopper 25 comprising the front wall 26, rear wall 27 and side walls 28 and 29 and having the bottom opening 30. A second and movable front wall 32 is located in the hopper 25 and has formed therewith the bifurcated arm 33 and the hinge lugs 34. The latter carry pivots 35 which are supported in openings formed in brackets 36, extending from the side walls 28 and 29 of the hopper 25. From the front wall 26 of the said hopper extends the bracket 40 in which is hinged the eye bolt 41, that carries the nut 42 having the groove 43, which latter registers with the opening in the bifurcated arm 33. By turning the nut 42 on the bolt 41 the wall 32 swings on the pivots 35, and thereby varies the area of the opening 30 in the bottom of the charging hopper 25.

From the side walls 28 and 29 of the said hopper 25 extend the pivots 46 on which are pivoted the arms 47, and 48 with the pin 49. The said arms carry the main door 50 for the opening 30. In the door 50 is formed the central supplemental opening 51. The said arm 47 has extending therefrom at its upper end the leg 52, that carries the pivot 53 and at its lower end has attached thereto the toe with the members 54 and 55. Pivots 58 on the arms 47 and 48 carry arms 59 and 60 respectively, and which carry the supplemental door 61 for the opening 51 in the door 50. An adjustable toe 62 with the nose 63 is carried on the arm 59, by means of the screws 64 engaging the slots 65 in said toe 62.

From the table 21 extend the brackets 68 that carry knife edge supports 69. Notched brackets 70 engage the supports 69 and are carried on the arms 72 of the balance beam designated generally by the numeral 73. The beam has formed therein the longitudinal slot 74 and carries the counterweights 75, 76. The weight 76 has extending therefrom the stud 77, that extends through the slot 74, and carries the wing nut 78 to clamp it with its accompanying counterweight 75, to the beam 73. From the counterweight 76 extend lugs 79 that carry the threaded rod 80 on which latter is eccentrically supported the supplemental adjusting weight 81. A shoe 85 and a stop 86 are carried on the top edge of the beam 73. The arms 72 carry the knife edge supports 87 for the hopper frame having the sides 88 and ends 89 and 90. From the sides 88 extend the curved guide arms 91, that register with rollers 95 journaled on pins 96, extending from brackets 97 carried on the table 21. The arms 91 by virtue of their coaction with the rollers 95 maintain the hopper frame in horizontal position. A pivot 100 on the end 89 of the said hopper frame supports the unlocking arm 101, having the forked end 102, which latter engages the pivot 53 on the arm 47, to oscillate the latter. A pivot 103 on the arm 101 carries the toe 104 having formed therewith the heel 105. The toe 104 is in the path of the member 54 and nose 63 to cause the doors 50 and 61 to open, while heel 105 bears against the arm 101 and constitutes a counterweight for the toe 104. Legs 110 extending from the ends 89 and 90 of the hopper frame carry the pivots 111. Stop plates 112 are carried on the inner faces of the sides 89 and 90 of the hopper frame.

The weighing hopper has the front wall 115, rear wall 116, side walls 118, 119 and has attached at the top edge thereof the reinforcing band 120, from which extend the legs 121 with the openings 122. The said pivots 111 engage the openings 122 and thereby support said weighing hopper. A central wall 123 divides said weighing hopper into two compartments 124, 125, having the discharge openings 126, 127.

Hinge brackets 130 are fastened to the side walls 118, 119 of the weighing hopper and support pivots 131 that extend from the bottom doors 132, 133 of said weighing hopper. To the rear ends of the said door 132, 133 are pinned one end of each of the links 134, the other ends of which latter are respectively pinned to levers 135 that are pivoted on the pivots 111.

A bracket 136 extends from the said weighing hopper and which has adjustably secured thereto a leg 137, by means of the screws 138. A pivot 139 in the leg 137 has journaled thereon a roller 140 which is in the path of a cam 141 supported on a bracket 142 extending from the table 21, to maintain the weighing hopper alternately in oppositely inclined positions while being charged. Noses 148 are carried on the ends of the levers 135 and are in the path of the stop plates 112.

A bracket 150 on the table 21 carries a pin 151, on one end of which is fastened the forked arm 152, by means of the screw 153. A pin 154 between the forked ends of said arm 152 has journaled thereon the roller 155, which is in the path of the shoe 85. A stop 156 extends from the arm 152, which latter is in the path of the stop 86. The pin 151 also carries a bracket 160 which in turn supports the arm 161 having the pin 162 and the leg 163 at right angles thereto. A counterweight 164 is secured in different positions to the leg 163 by means of a screw 165.

A forked bracket 170 supported on the table 21 carries a pivot 171, on which is pivoted a stop lever 172, one end of which latter is guided by a second forked bracket 173 also supported on the table 21. A nose 174 of the lever 172 is in the path of the pin 162 of the arm 161. The end of the lever 172 opposite the toe 174 is in the path of the member 55. A supporting hanger 178 extends from the table 21 to support the beam 73 when in its lowered position.

To use the weighing apparatus the operator charges the charging hopper 25 with the material to be weighed, and the toe 104 bearing against the member 54 maintains both doors 50 and 61 open. The material now enters one of the compartments 124 or 125 of the weighing hopper, passing through the opening 21ª in the table 21. If the weighing hopper is located as shown in Figs. 4 and 5 the material will enter the compartment 124, the bottom door 133 being in its closed position. The weight of the material will lower the weighing hopper, after the latter has been filled a certain amount and which will cause the balance beam 73 to swing up. As the beam 73 rises, the shoe 85 comes in the path of the roller 155 and as the latter rolls on said shoe, it tilts the arm until the pin 162 comes in contact with 161, until the pin 162 comes in contact with the nose 174 of the stop lever 172, at which instant the beam 73 is stopped from rising for an instant. The counterweight 164 has at the same time passed beyond the vertical plane passing through the axis of the pin 151, and the roller 155 has been swung to near the end of the contact surface of the toe 85. At the same time the tilting arm 101 has lowered with the hopper frame having the sides 88 and 89, lowering thereby the toe 104, which disengages from the member 54, and allows the door 50 to close the opening 30 of the charging hopper 25. The supplemental door 61 is however still kept in its open position, by reason of the toe 62 bearing against the toe 104. The closing of the door 50 causes the member 55 to lift the end of the stop lever 172, and thereby the nose 174 clears the pin 162. At this time the material passes through the supplemental opening 51, and continues until the descent of the weighing hopper allows the nose 63 of the door 61 to clear the toe 104, when the supplemental door closes by gravity. The lowering of the weighing hopper permits the roller 140 to clear under the cam 141, and thereby the weight of the material in the weighing hopper causes it to tilt to its opposite position. The nose 148 comes in contact with the stop plate 112, opening the door 133 by means of one pair of the links 134, and at the same time closes the door 132, by means of the other pair of links 134, and the material will be discharged from the hopper. The balance beam 73 will then descend and the stop 86 bearing against the stop 156 causes the lever 161 to swing to its initial position, the beam lowering until stopped by the supporting hanger 178. When the outer end of the beam 73 descends the hopper frame having the sides 88 and ends 89 and 90 rises, and the locking arm 101 is also caused to rise. The upward movement of the arm 101 is transmitted to the pivot 53, by virtue of which the arm 47 rises, which causes the doors 51 and 61 to move to their open positions. The machine is now ready for a second operation.

Having described my invention what I desire to secure by Letters Patent and claim is:

1. In a weighing apparatus of the character described the combination of a table having an opening, a charging hopper having an opening in the bottom thereof carried on the table over its opening, a door for the opening in the hopper, a balance beam suspended below the table, a hopper frame suspended at one end of said beam, a weighing hopper suspended in said frame below the opening in the table, means to actuate said door by virtue of the movements of the hopper frame due to the entrance and weight of material therein.

2. In a weighing apparatus of the character described the combination of a table, a charging hopper over the table and having a discharge opening, means to vary the area of said opening, a balance beam suspended under the table, a hopper frame suspended on the beam, a weighing hopper suspended on the hopper frame, a pair of compartments in the discharging hopper, a door for each compartment pivoted on the weighing hopper, means to open one of said doors while closing the other and means to check the upward movement of the balance beam.

3. In a weighing apparatus of the character described the combination of a table having an opening, a charging hopper having an opening in the bottom thereof carried on the table over its opening, a balance beam suspended below the table, a hopper frame suspended at one end of said beam, a weighing hopper suspended in said hopper frame below the opening in said table, a pair of arms pivoted on the charging hopper, a main door having an opening carried by said arms, a pivot on one of said arms, a second pair of arms pivoted on the arms of the main door, a supplemental door carried by the second pair of arms, an unlocking arm with one end pivoted to the hopper frame, a forked end at the other end of the unlocking arm engaging the said pivot on one of the said first arms, a toe with a pair of members carried by one of the arms of the main door, a toe carried on one of the arms of the supplemental door and a toe carried on the unlocking lever in the path of one of the members of the toe of the arm of the main door and in the path of the arm of the supplemental door.

4. In a weighing apparatus of the character described the combination of a table, a charging hopper having an opening in the bottom thereof carried on the table over its opening, a balance beam suspended below the table, a hopper frame suspended at one end of said beam, a weighing hopper suspended in said hopper frame below the opening in said table, curved guide arms carried by the hopper frame, a roller for each of said guide arms journaled above said table to maintain the hopper frame in horizontal planes during its movements.

5. In a weighing apparatus of the character described the combination of a table having an opening, a charging hopper having an opening in the bottom thereof carried on the table over its opening, a balance beam suspended below the table, a hopper frame suspended at one end of said beam, a weighing hopper suspended in said hopper frame below the opening in said table, a shoe carried on said beam, a stop carried on the beam, an arm pivoted on the table, a roller journaled in the lower end of the arm to register with the said shoe on the beam, a stop on said arm in the path of the stop on the beam, a pin carried on said arm, a stop lever pivoted over the table, a nose at one end of the stop lever in the path of said pin to stop the movement of the arm and thereby the beam at predetermined intervals and means to swing the stop lever to clear its nose from the pin on said arm.

6. In a weighing apparatus of the character described the combination of a table having an opening, a charging hopper having an opening in the bottom thereof carried on the table over its opening, a balance beam suspended below the table, a hopper frame suspended at one end of said beam, a weighing hopper suspended in said hopper frame, a pair of compartments in the weighing hopper, a roller journaled on the weighing hopper, a cam carried on the table in the path of said roller to locate the weighing hopper during its movements in oppositely inclined positions, doors pivoted to the weighing hopper for each compartment thereof, a lever pivoted to the weighing hopper, links connecting said lever and said doors and a stop plate on the hopper frame in the path of the ends of said lever.

7. In a weighing apparatus the combination of a charging hopper having an opening for the discharge of material therefrom, arms pivoted on the hopper, a door carried by the arms for the opening in said hopper, a toe with a pair of members on one of said arms, a table supporting said hopper, a balance beam suspended below said table, a hopper frame suspended on the beam, an unlocking arm with one end pivoted on the hopper frame, a forked end on the other end of the unlocking arm, a pin on one of the arms of the door engaging said forked end, a toe carried on the unlocking arm in the path of one of said members of the said toe, a stop lever pivoted over the table with one end in the path of the second member of said toe, an arm pivoted on the table, a roller journaled in the lower end of the latter arm located to register with the balance beam and a pin on said arm in the path of the stop lever.

Signed at the borough of Manhattan in the county of New York and State of New York this 30th day of April A. D. 1912.

ZIGMUND LIPOFSKY.

Witnesses:
A. A. DE BONNEVILLE.
ANNA SLUTSKY.

Copies of this patent may be obtained for five cents each, by addressing the "Commissioner of Patents, Washington, D. C."